(12) United States Patent
Nishino et al.

(10) Patent No.: US 10,095,067 B2
(45) Date of Patent: Oct. 9, 2018

(54) LIQUID CRYSTAL DISPLAY DEVICE

(71) Applicant: Japan Display Inc., Tokyo (JP)

(72) Inventors: Tomonori Nishino, Tokyo (JP); Masato Shimura, Tokyo (JP); Tomokazu Ishikawa, Tokyo (JP); Yuki Kuramoto, Tokyo (JP); Satoshi Hashimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 369 days.

(21) Appl. No.: 14/957,888

(22) Filed: Dec. 3, 2015

(65) Prior Publication Data
US 2016/0161778 A1  Jun. 9, 2016

(30) Foreign Application Priority Data
Dec. 4, 2014 (JP) ................. 2014-245894

(51) Int. Cl.
G02F 1/1339 (2006.01)
G02F 1/1337 (2006.01)
G02F 1/1333 (2006.01)

(52) U.S. Cl.
CPC .......... *G02F 1/1339* (2013.01); *G02F 1/1337* (2013.01); *G02F 2001/133388* (2013.01)

(58) Field of Classification Search
None
See application file for complete search history.

(56) References Cited

U.S. PATENT DOCUMENTS

2007/0279565 A1* 12/2007 Iwato ............... G02F 1/133711
349/139
2007/0291216 A1* 12/2007 Chan ..................... G02F 1/1339
349/153

FOREIGN PATENT DOCUMENTS

JP          2007-322627 A      12/2007

* cited by examiner

*Primary Examiner* — Thanh-Nhan P Nguyen
(74) *Attorney, Agent, or Firm* — Typha IP LLC

(57) ABSTRACT

There is achieved a liquid crystal display device having a smaller picture frame region and a seal part of improved reliability. A liquid crystal display device includes a TFT substrate having a display region and a terminal region and formed with an organic passivation film, a counter substrate attached to the TFT substrate through a seal part, and a liquid crystal contained inside the seal part. A hole is formed at a predetermined pitch on the organic passivation film of the TFT substrate corresponding to the seal part when viewed on a plane. When the hole is viewed on a plane, a shortest distance from the hole to the hole is four micrometers or greater and 12 micrometers or less at a height of h1=0.9×h2 from a bottom face of the hole, where a depth of the hole is defined as h2.

20 Claims, 8 Drawing Sheets

LIQUID CRYSTAL DISPLAY DEVICE

CLAIM OF PRIORITY

The present application claims priority from Japanese Patent Application JP 2014-245894 filed on Dec. 4, 2014, the content of which is hereby incorporated by reference into this application.

BACKGROUND

The present invention relates to a display device, and to a liquid crystal display device having a small picture frame region around a screen.

A liquid crystal display device includes a TFT substrate and a counter substrate. On the TFT substrate, a pixel including a pixel electrode, a thin film transistor (TFT), and other elements is formed in a matrix configuration. The counter substrate is disposed opposite to the TFT substrate. A liquid crystal is sandwiched between the TFT substrate and the counter substrate. Images are formed by controlling the light transmittance of liquid crystal molecules for each pixel.

The TFT substrate is attached to the counter substrate with a sealing material provided on the edge areas of the substrates, and the inside of the substrates is filled with the liquid crystal. On the interface between the substrate and the liquid crystal, an alignment film is used to initially align the liquid crystal. However, since the attachment of the alignment film to the sealing material is poor, it is necessary to remove the alignment film from a seal part in order to enhance the reliability of the seal part.

In order to remove the alignment film from the seal part, Japanese Unexamined Patent Application Publication No. 2007-322627 describes a configuration in which recessed grooves are formed on an organic passivation film between a seal part and a display region along the edge of a substrate and ITO is formed on the organic passivation film for preventing an alignment film material from reaching the seal part in coating the alignment film material.

SUMMARY

Specifically in small-sized liquid crystal display devices, there is a strong demand to increase the screen size with respect to the outer dimensions. To this end, it is necessary to reduce the width of the picture frame around the screen (the display region). This makes it difficult to form a configuration between the seal part and the display region, in which the alignment film is removed from the seal part.

In other words, since the alignment film material is a liquid when coated, it is spatially difficult to provide a structure to remove the alignment film from the seal part on the edge area of the substrate. On the other hand, suppose that the alignment film can be coated to the edge area of the substrate, this is significantly advantageous in the concept of processing as well as in the concept of forming a narrow picture frame. However, in this case, the adhesive strength of the alignment film to the sealing material causes a problem.

It is an object of the present invention to achieve a highly reliable liquid crystal display device that increases the adhesive strength of an alignment film to a sealing material with a narrow picture frame even though the alignment film is formed to the edge area of a substrate.

An aspect of the present invention is to solve the problems. Specific solutions are as follows.

(1) A liquid crystal display device includes a TFT substrate having a display region and a terminal region and formed with an organic passivation film, a counter substrate attached to the TFT substrate through a seal part, and a liquid crystal contained inside the seal part. A hole is formed at a predetermined pitch on the organic passivation film of the TFT substrate corresponding to the seal part when viewed on a plane. When the hole is viewed on a plane, a shortest distance from the hole to the hole is four micrometers or greater and 12 micrometers or less at a height of $h1=0.9 \times h2$ from a bottom face of the hole, where a depth of the hole is defined as $h2$.

(2) In the liquid crystal display device according to (1), the planar shape of the hole is a square, and a length of a side of the square is one micrometer or greater and seven micrometers or less.

(3) In the liquid crystal display device according to (1), the planar shape of the hole is a circle, and a diameter of the circle is one micrometer or greater and seven micrometers or less.

(4) In the liquid crystal display device according to (1), the planar shape of the hole has a major dimension and a minor dimension, and the major dimension is one micrometer or greater and seven micrometers or less.

(5) In the liquid crystal display device according to (1), the depth $h2$ of the hole is one micrometer or greater.

(6) In the liquid crystal display device according to (1), a value $d1 \times d11/p1 \times p2$ is greater on an outer area of the seal part than on an inner area of the seal part, where a pitch of the hole in a first direction is defined as $p1$, a pitch in a second direction is defined as $p2$, a major dimension of the planar shape of the hole is defined as $d1$, a minor dimension is defined as $d11$, a portion of the seal part on the liquid crystal side is defined as the inner area, a portion of the seal part on an opposite side of the liquid crystal is defined as the outer area, and a distance from an inner edge to an outer edge of the seal part is defined as a width of the seal part.

(7) In the liquid crystal display device according to (6), on an inner side from a center of the seal part in a width direction, the hole is not formed.

(8) In the liquid crystal display device according to any one of (1) to (7), an overcoat film made of an organic material is formed on the counter substrate corresponding to the seal part, and a second hole is formed on the overcoat film at a predetermined pitch when viewed on a plane, and a shortest distance from the second hole to the second hole is four micrometers or greater and 12 micrometers or less, where a depth of the second hole is defined as $h2$, and the second hole is viewed on a plane at a height $h1=0.9 \times h2$ from a bottom face of the second hole.

DETAILED DESCRIPTION

In the following, the content of embodiments of the present invention will be described in detail.

First Embodiment

Figure 1:
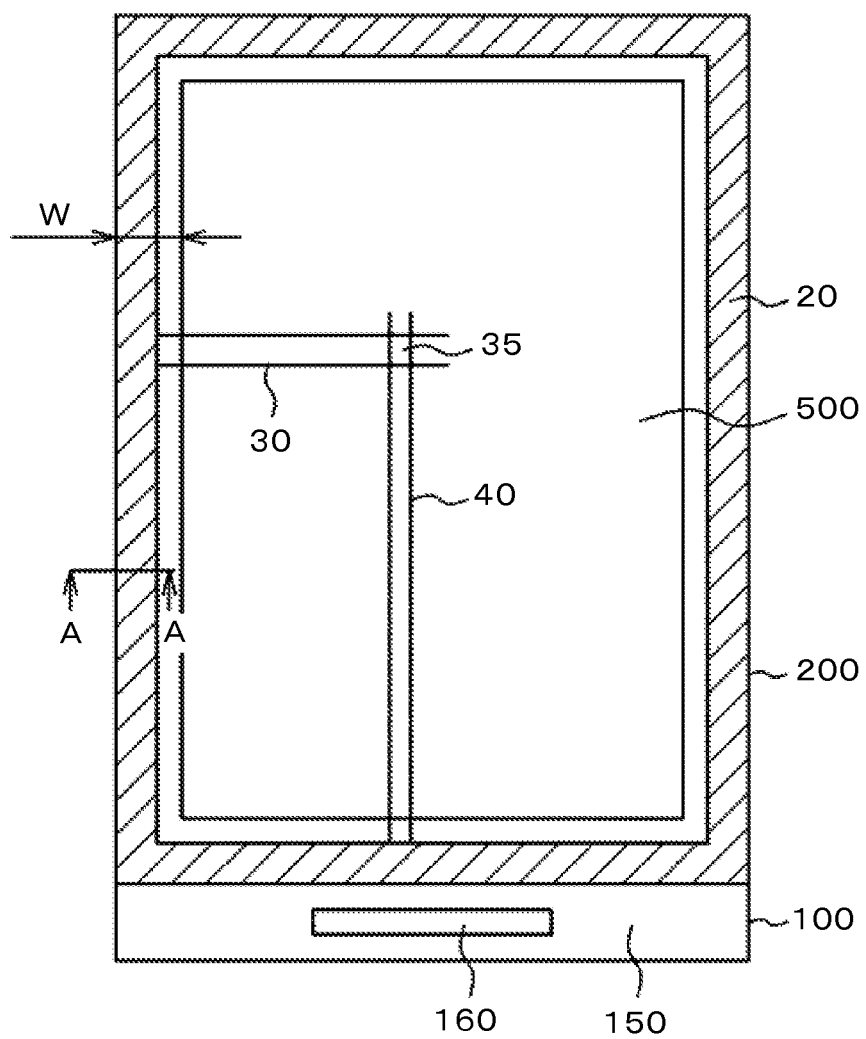
FIG. 1 is a plan view of a liquid crystal display device according to an embodiment of the present invention.

FIG. 1 is a plan view of a liquid crystal display panel configuring a liquid crystal display device to which an embodiment of the present invention is adapted. In FIG. 1, a TFT substrate 100 is attached to a counter substrate 200 with a sealing material 20, and a liquid crystal is sandwiched between the TFT substrate 100 and the counter substrate 200. The TFT substrate 100 is formed greater than the counter substrate 200. A terminal region 150 is formed on the panel where only the TFT substrate 100 is provided. On the terminal region 150, an IC driver 160 is disposed to drive the liquid crystal display panel, and terminals and other components are formed to connect a flexible circuit board for supplying power, picture signals, scanning signals, and other signals to the liquid crystal display panel.

In FIG. 1, on a display region 500, scanning lines 30 are extended in the lateral direction and arrayed in the vertical direction. Picture signal lines 40 are extended in the vertical direction and arrayed in the lateral direction. A region surrounded by the scanning line 30 and the picture signal line 40 is a pixel 35. In a narrow picture frame, a distance w from the edge of the display region 500 to the edge of the liquid crystal display panel is as short as about one millimeter, which reduces the width of the sealing material accordingly.

The liquid crystal display device uses an alignment film to initially align the liquid crystal. Since the adhesive strength of the alignment film to the sealing material is poor, the alignment film is not desirably formed on the seal part. However, in the configuration with a narrow picture frame as illustrated in FIG. 1, it is difficult to remove the alignment film from the seal part. In the embodiment of the present invention, a configuration described below can enhance the reliability of the seal part even through the alignment film is formed to the edge of the substrate.

Figure 2:
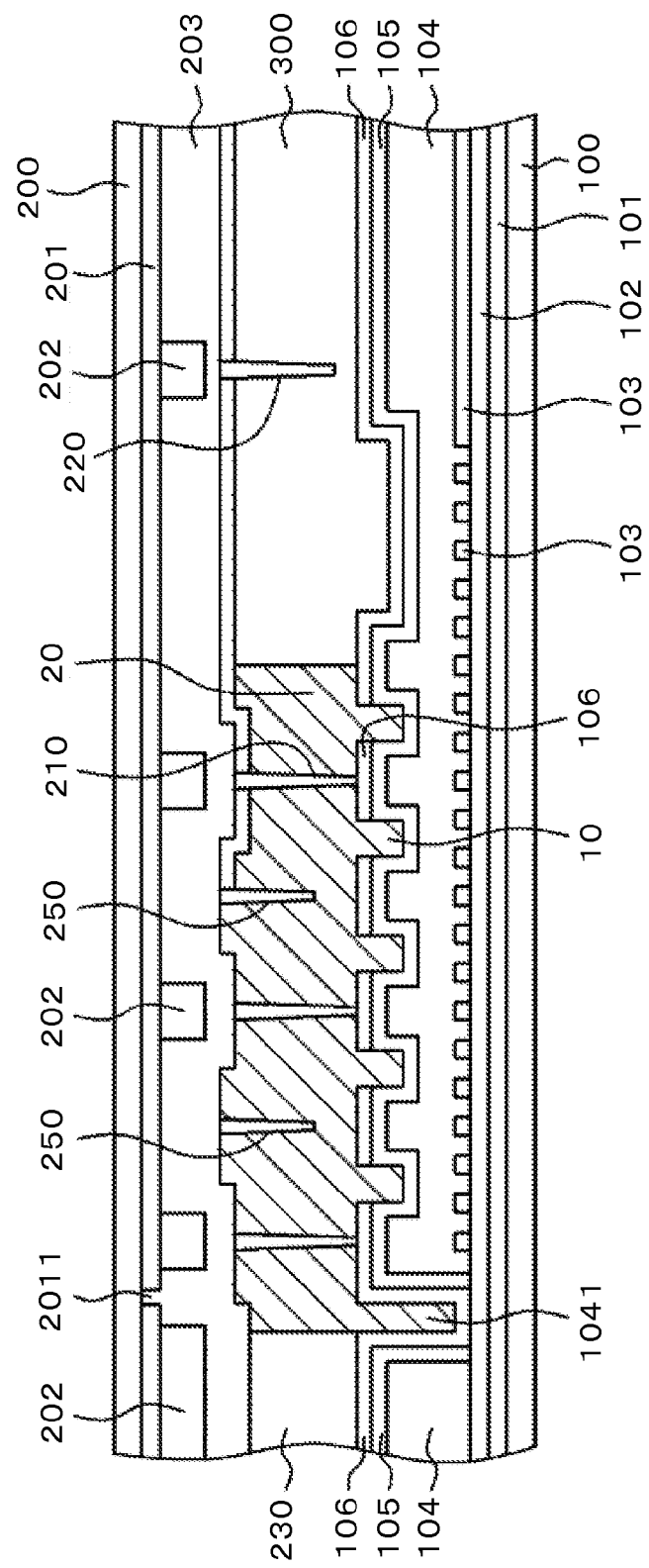
FIG. 2 is a cross sectional view taken along line A-A in FIG. 1.

FIG. 2 is a detailed cross sectional view of the seal part corresponding to a cross section taken along line A-A in FIG. 1. On the seal part illustrated in FIG. 2, the TFT substrate 100 is attached to the counter substrate 200 with the sealing material 20. In FIG. 2, the region on the inside of the sealing material 20 is filled with the liquid crystal 300.

In FIG. 2, on the TFT substrate 100 made of glass, a first insulating film 101 is formed. In some cases, for example, the first insulating film 101 is an undercoat film formed for preventing glass-derived impurities from contaminating the semiconductor layer of the TFT. On the first insulating film 101, a second insulating film 102 is formed. In some cases, the second insulating film 102 is the gate insulating film of the TFT. On the second insulating film 102, a scanning lead line 103 is formed. The rectangular scanning lead line 103 in FIG. 2 is the cross section of the scanning lead line 103 viewed from the upper side of FIG. 1.

In some cases, a scanning line drive circuit is formed on the lower side of the sealing material 20 depending on products, instead of the scanning lead line 103. In FIG. 2, the scanning lead line 103 also typically represents the case of such a scanning line drive circuit.

An organic passivation film 104 is formed to cover the scanning lead line 103. The organic passivation film 104 is thickly formed as thick as from two to four micrometers, also functioning as a planarization film. The organic passivation film 104 is formed of a photosensitive resin, with no need of a photoresist for patterning.

The organic passivation film 104 is formed of a resin, such as an acrylic resin. Such a film easily absorbs moisture. This film causes a problem in that the specific resistance of the liquid crystal is reduced due to the influence of moisture, which is externally entered, for example. In order to prevent such a phenomenon, an inorganic insulating film 105 formed of SiN or other compounds is formed to cover the organic passivation film 104. The inorganic insulating film 105 is sometimes referred to as the interlayer insulating film 105.

The interlayer insulating film 105 is an interlayer insulating film between a lower electrode flatly formed and an upper electrode having line electrodes on the display region of an IPS liquid crystal display device. In some cases, the lower electrode is a common electrode, and the upper electrode is pixel electrode, and vice versa. Both of the lower electrode and the upper electrode are formed of a transparent oxide conductive film represented by ITO (Indium Tin Oxide).

The organic passivation film 104 is prone to pass moisture. In order to block moisture passed from the edge of the liquid crystal display panel through the organic passivation film 104, a groove through hole 1041 is formed on the organic passivation film 104. This groove through hole 1041 is formed on the inside of the seal part entirely around the TFT substrate 100 to surround the display region.

An aspect of the embodiment of the present invention is to enable the formation of an alignment film 106 to the edge of the TFT substrate 100. In other words, in the embodiment of the present invention, a configuration is provided in which on the seal part, a large number of holes 10 in a predetermined shape are formed at predetermined pitches on the organic passivation film 104 and the alignment film 106 is prevented from being entered to the holes 10. In other words, although the alignment film material is a liquid, the alignment film has a predetermined surface tension. Thus, in the case in which the holes 10 have a small size and spaced with a predetermined pitch or less, the alignment film material is not entered into the holes 10.

On the other hand, the sealing material 20 has a surface tension different from the surface tension of the alignment film material, and has an excellent wettability to the interlayer insulating film 105 more than to the alignment film 106. Thus, the sealing material 20 is also entered into such holes like the holes 10. Therefore, in the hole 10, the sealing material 20 is directly contacted with the interlayer insulating film 105 not through the alignment film 106, and thus the adhesive strength of the sealing material 20 can be increased on the seal part. Suppose that the alignment film 106 can be formed to the edge of the substrate, the degree of freedom of coating the alignment film 106 can be enhanced, and the processes can be simplified. More specifically, in the case in which the TFT substrate 100 is fixed to the counter substrate 200 with the sealing material 20 under a reduced pressure, the sealing material 20 is more easily entered into the holes.

On the seal part in FIG. 2, the alignment film 106 is formed on the interlayer insulating film 105 except the holes 10. The alignment film 106 is formed to the edge of the TFT substrate 100. Suppose that the alignment film 106 can be formed to the edge of the substrate, the alignment film 106 can be formed using various coating processes, such as ink jet and spinner, in addition to flexographic printing.

In FIG. 2, a black matrix 201 is formed on the counter substrate 200. In FIG. 2, the black matrix 201 is provided to prevent light leakage from the seal part. Since the black matrix 201 is a light shielding film formed of a resin, the black matrix 201 is formed with a black matrix groove 2011 to block moisture, which is entered into the resin. On the black matrix 201, a color filter 202 is formed in stripes in the vertical direction in FIG. 2. On the seal part, the color filter 202 is formed corresponding to a first columnar spacer 210 formed on an overcoat film 203.

The overcoat film 203 made of an organic material is formed on the color filter 202. On the overcoat film 203, a projection is formed corresponding to the color filter 202. As corresponding to the projection, the first columnar spacer 210 is formed to define a gap between the TFT substrate 100 and the counter substrate 200 in order to define the gap between the TFT substrate 100 and the counter substrate 200 similarly to the gap on the display region.

In FIG. 2, on the counter substrate 200, a second columnar spacer 220 is formed whose height from the surface of the counter substrate 200 is lower than the height of the first columnar spacer 210. The second columnar spacer 220 is responsible for preventing an excessive reduction in the gap between the TFT substrate 100 and the counter substrate 200 in the case in which a pressure is externally applied to the counter substrate 200.

On the outer side of the first columnar spacer 210, a wall spacer 250 is formed. The wall spacer is a stopper on the counter substrate against the alignment film 106. The wall spacer 250 is formed in two steps. The alignment film 105 is formed to cover the overcoat film 203. The wall spacer 250 separates the outer shape of the alignment film 105. The wall spacer 250 may be formed on the inner side of the first columnar spacer 210.

On the counter substrate 200, the wall spacer 250 to be the alignment film stopper can be formed simultaneously when the columnar spacer 210 is formed. Therefore, since the range of the alignment film 105 can be easily defined, the configuration on the counter substrate 200 is different from the configuration on the TFT substrate 100. However, in order to match the alignment film coating process with the process on the TFT substrate 100, holes may be formed on the overcoat film 203 similarly to the TFT substrate 100. Therefore, the configuration of the hole 10 described below is also applicable to the organic passivation film 104 on the TFT substrate 100 as well as the overcoat film 203 on the counter substrate 200.

On the edge of the seal part, a bank spacer 230 is formed. The efficiency is poor when liquid crystal display panels are manufactured separately. Thus, a plurality of liquid crystal display panels is formed on a mother board, and the plurality of liquid crystal display panels is collectively manufactured. On the mother board on which the plurality of liquid crystal display panels is formed, the bank spacer 230 is disposed on the boundary between the adjacent liquid crystal display panels. The mother board is scribed along the center of the bank spacer 230, and then the mother board is cut into separate liquid crystal display panels. In the case in which the bank spacer 230 is not provided, the sealing material 20 is applied to the mother board where the bank spacer 230 is not provided. However, in the case in which the sealing material 20 is present, the mother board is not enabled to be cut even though the mother board is scribed.

Figure 3:
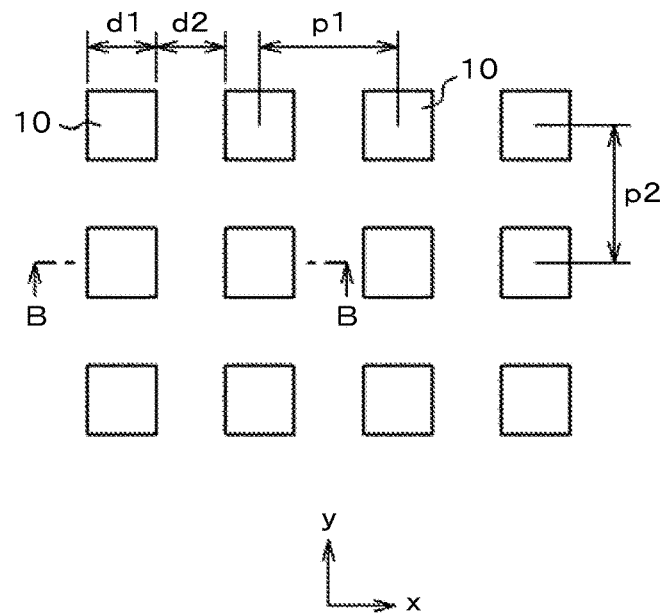
FIG. 3 is a plan view of holes formed on an organic passivation film.

FIG. 3 is the shapes of the holes 10 and the pitches between the holes 10 formed on the organic passivation film 104 on the seal part of the TFT substrate 100. The shape of the hole 10 is the shape of the hole formed on the organic passivation film 104. On the organic passivation film 104, the SiN interlayer insulating film 105 is formed. The interlayer insulating film 105 has a film thickness smaller than the film thickness of the organic passivation film 104, and is formed along the shape of the organic passivation film 104. Thus, the shape of the hole on the organic passivation film 104 expresses the shape of the hole formed on the TFT substrate 100. The interlayer insulating film 105 is not necessarily formed on all the holes 10. The interlayer insulating film 105 may be partially formed on the holes, or no interlayer insulating film 105 may be formed on all the holes.

Figure 4:
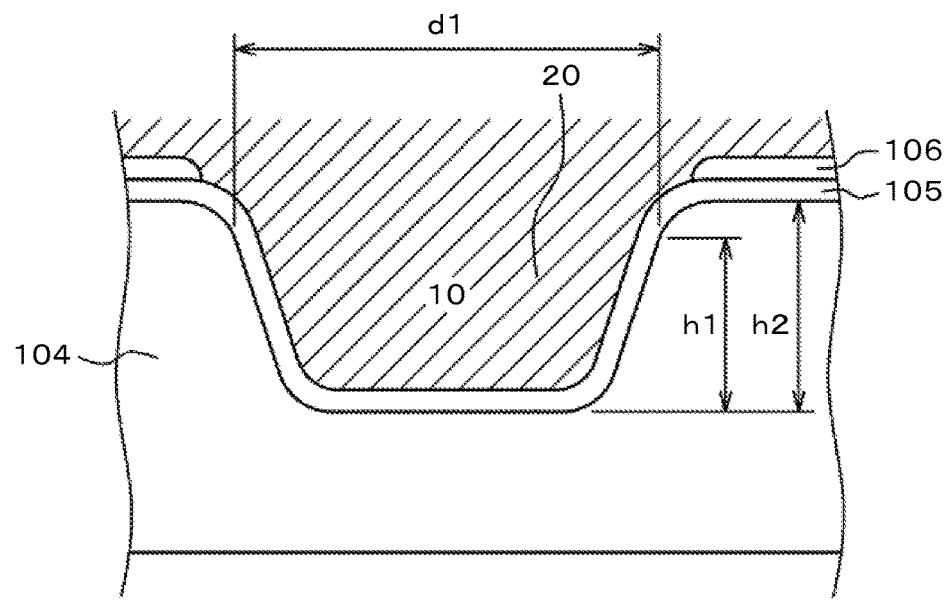
FIG. 4 is a detailed cross sectional view of the hole.

In FIG. 3, the planar shape of the hole 10 is a square where one side is defined as d1, and the distance between the holes 10 is defined as d2. The hole distance is expressed by the minimum distance between the holes. The pitch in the X-direction is defined as p1, and the pitch in the Y-direction is defined as p2. FIG. 4 is a detailed cross sectional view of the hole 10. The hole 10 is formed by half exposure. Thus, the edge of the hole 10 is unclear, and changed smoothly. In the present specification, in the case in which the depth of the hole 10 is defined as h2, the height of 90% of h2 from the bottom of the hole 10, i.e., the size at a height h1, is referred to as a hole size for the size of the hole 10. The distance between the holes 10 is also referred to as a distance at this position.

Figure 5:
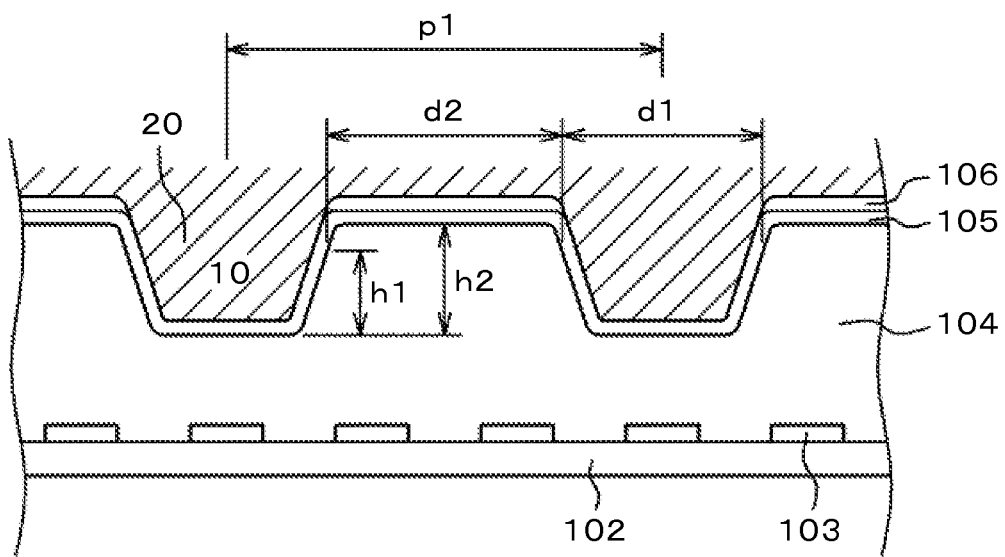
FIG. 5 is a cross sectional view taken along line B-B in FIG. 3.

As illustrated in FIG. 4, on the organic passivation film 104 on which the hole 10 is formed, the interlayer insulating film 105 is formed. The alignment film 106 is not entered into the hole 10. However, the sealing material 20 is entered into the hole 10. In the hole 10, the sealing material 20 is strongly attached to the interlayer insulating film 105. FIG. 5 is a cross sectional view taken along line B-B in FIG. 3. In FIG. 5, the interlayer insulating film 105, the alignment film 106, the sealing material 20, and other components are also illustrated. As illustrated in FIG. 5, the size of the hole 10 and the distance between the holes 10, which are formed on the organic passivation film 104, are based on the position of the height h1 from the bottom of the hole 10. Here, h1/h2=0.9, where the depth of the hole is defined as h2. Although the alignment film 106 is not entered into the hole 10, the sealing material 20 is entered into the hole 100. In FIG. 5, the hole 10 is a half hole, not a through hole, for protecting the scanning lead line 103 or the scanning line drive circuit formed below the holes 10.

Here, in order not to enter the alignment film material into the holes 10 in coating the alignment film material, the shape of the hole 10, the hole distance between the holes 10, and other factors are important factors. The most important factor is the hole distance d2. In order to reject the alignment film material from the hole 10, the distance between the holes 100 is preferably short. The distance is necessarily 12 micrometers or less. On the other hand, in the case in which the hole distance d2 is four micrometers or less, it is difficult to independently form necessary holes 10. Therefore, the hole distance is desirably four micrometers or greater and 12 micrometers or less.

In the case in which the hole size is too large, the effect of the hole 10 is not exerted. In order to provide the function of the hole 10 to reject the alignment film material, the hole size d1 is necessarily seven micrometers or less. On the other hand, in the case in which the hole size is too small, it becomes difficult to provide the depth of the hole 10. Thus, the hole size d1 is necessarily one micrometer or greater.

In order to provide the shape of the hole, the depth h2 of the hole 10 is necessarily one micrometer or greater. However, in the case in which a through hole is formed, it becomes difficult to protect the scanning lead line 103 or the scanning line drive circuit formed below the organic passivation film 104. Thus, the hole 10 is desirably a half hole.

Figure 6:
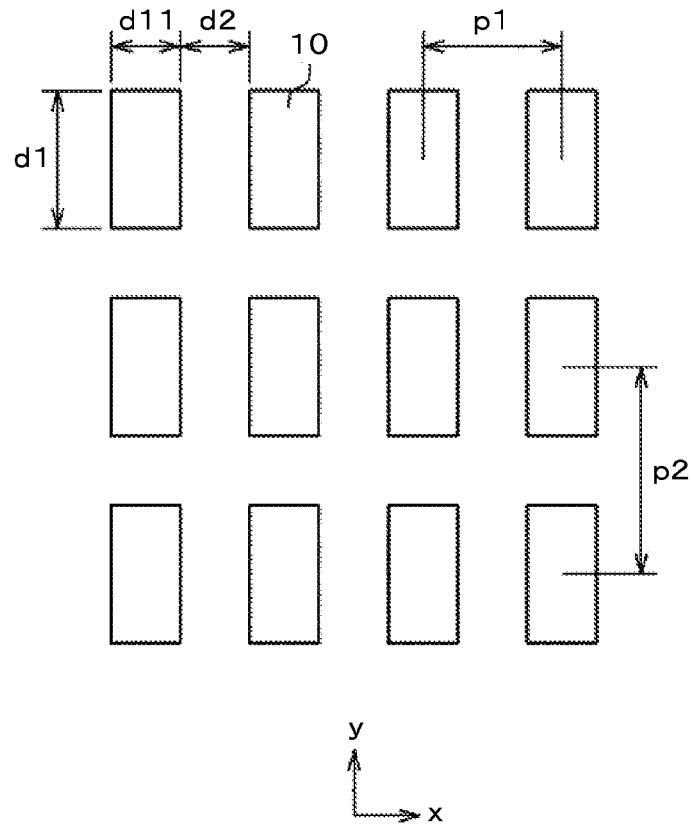
FIG. 6 is a plan view of holes in another shape.

In the description above, the case is described in which the planar shape of the hole 10 is a square. However, in the embodiment of the present invention, the shape is not limited to a square. Any shapes are applicable to the planar shape of the hole 10. FIG. 6 is a diagram of the case in which the planar shape of the hole 10 is a rectangle. In this case, the size d1 of the hole 10 described in FIG. 3 corresponds to a height d1 (a major dimension). In FIG. 6, the base of the hole 10 is defined as d11 (a minor dimension). The distance d2 between the holes 10 is the shortest distance between the holes 10 similarly in FIG. 3. The pitch in the X-direction in FIG. 6 is defined as p1, and the pitch in the Y-direction is defined as p2.

Figure 7:
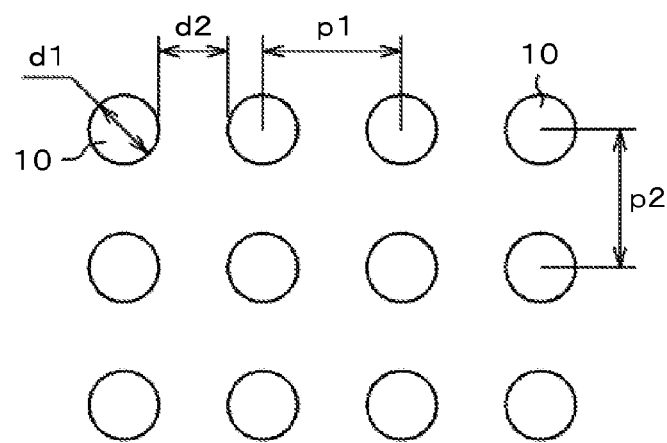
FIG. 7 is a plan view of holes in still another shape.

FIG. 7 is a diagram of the case in which the planar shape of the hole 10 is a circle. In this case, the size d1 of the hole 10 is the diameter of the circle, and the distance d2 between the holes 10 is the shortest distance between the holes 10 similarly in FIG. 3. The pitch in the X-direction in FIG. 7 is defined as p1, and the pitch in the Y-direction is defined as p2.

Figure 8:
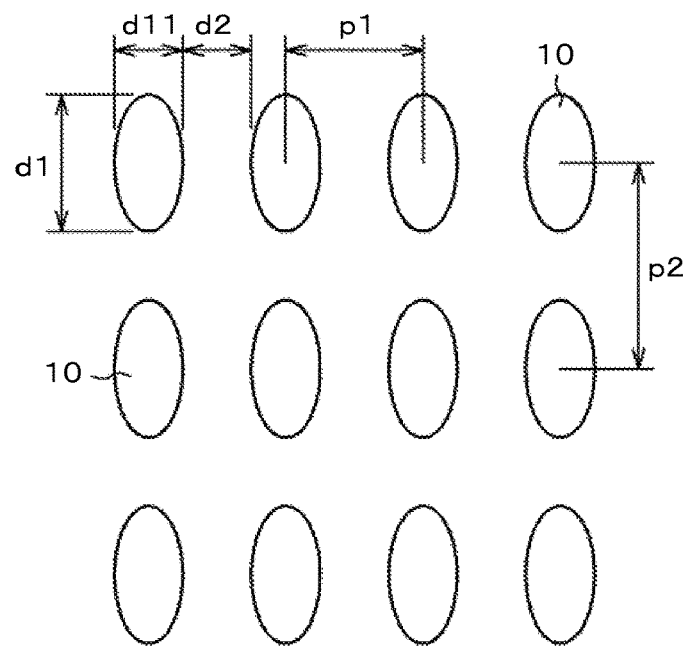
FIG. 8 is a plan view of holes in still another shape.

FIG. 8 is a diagram of the case in which the planar shape of the hole 10 is an ellipse. In this case, the size d1 of the hole 10 described in FIG. 3 corresponds to a major axis d1 (a major dimension) of the ellipse, and the distance d2 between the holes 10 is the shortest distance between the holes 10 similarly in FIG. 3. In FIG. 8, the minor axis (the minor dimension) of the hole is defined as d11. The pitch in the X-direction in FIG. 8 is defined as p1, and the pitch in the Y-direction is defined as p2.

Even in the case in which the planar shape of the hole 10 is the shapes in FIGS. 6 to 8, the cross sectional shape of the hole is similar to the shapes described in FIGS. 4 and 5.

Figure 9:
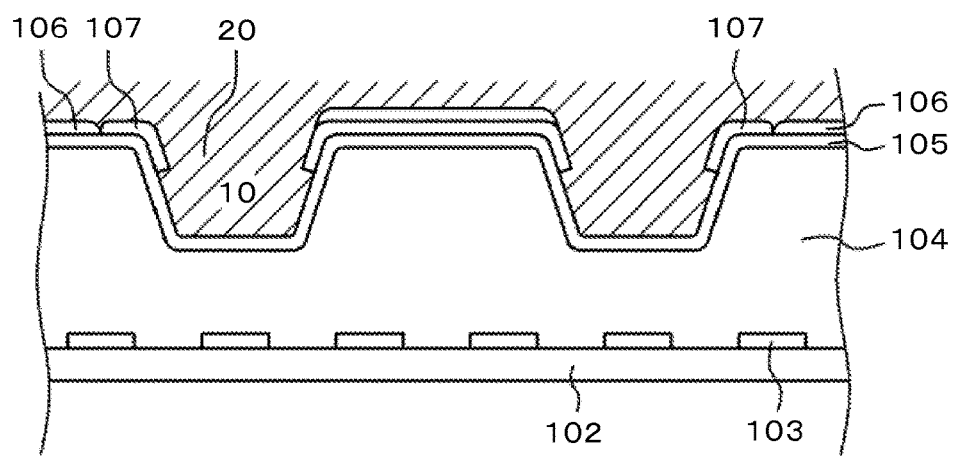
FIG. 9 is a detailed cross sectional view of holes in still another shape.

FIG. 9 is a cross sectional view of another shape of the hole 10 according to the embodiment of the present invention. FIG. 9 is different from FIG. 5 in that an ITO (Indium Tin Oxide) film 107 is formed on the interlayer insulating film 105; the interlayer insulating film 105 is formed on the organic passivation film 104. However, the ITO film 107 is formed near the upper side of the hole 10 and on the side wall of the hole 10, but not formed on the bottom of the hole 10. The reason why the ITO film is not formed on the bottom of the hole 10 is to eliminate the possibility that the ITO film 107 short-circuits the scanning lead line 103 or the scanning line drive circuit formed below the organic passivation film 104. The ITO film 107 has a poor wettability to the alignment film material. Thus, in the case in which the ITO film 107 is formed on the mouth of the hole, the ITO film 107 makes it more difficult to enter the alignment film material into the hole 10.

As described above, according to the embodiment, the hole 10 is formed on the organic passivation film 104 on the seal part. This prevents the alignment film 106 from being formed in the hole 10, and thus the adhesive strength of the sealing material 20 can be improved in the hole 100. Accordingly, it is possible to achieve a liquid crystal display device that has a narrow picture frame and a highly reliable seal part.

Second Embodiment

Figure 10:
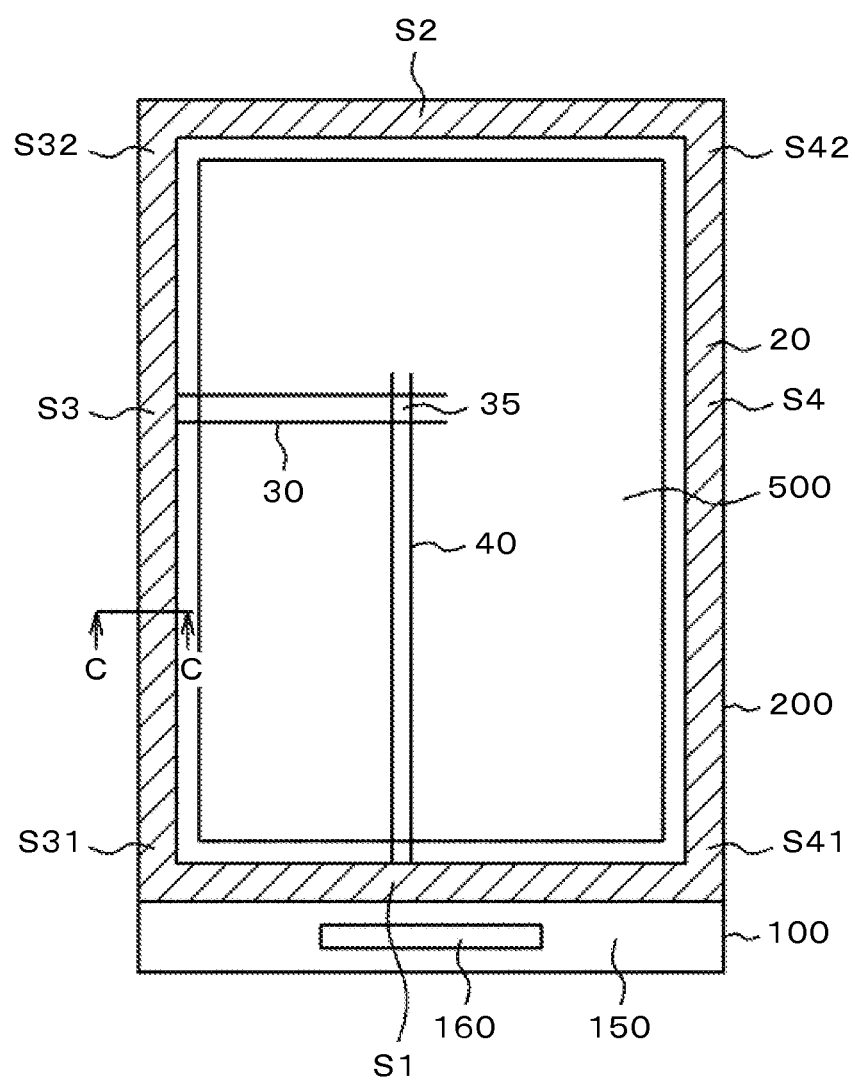
FIG. 10 is a plan view of a liquid crystal display device according to a second embodiment.

The holes 10 described in the first embodiment may be uniformly formed on the seal part, or do not necessarily have to be uniformly formed. In some cases, it is difficult to uniformly form the holes 10 on the seal part. However, also in this case, the effect according to the first embodiment of the present invention can be obtained. FIG. 10 is a plan view for explaining regions on which holes 10 are formed in a second embodiment. In FIG. 10, a side region S1 is provided on the terminal region side. A side region S2 is provided opposed to the side region S1. A side region S3 is provided on the left side of the side region S1. A side region S4 is provided on the right side of the side region S1.

A portion S31 of the side region S3 is located near to the side region S1. A portion S32 of the side region S3 is located far from the side region S1. A portion S41 of the side region S4 is located near to the side region S1. A portion S42 of the side region S4 is located far from the side region S1. The other configurations in FIG. 10 are similar to the configurations described in FIG. 1.

Figure 11:
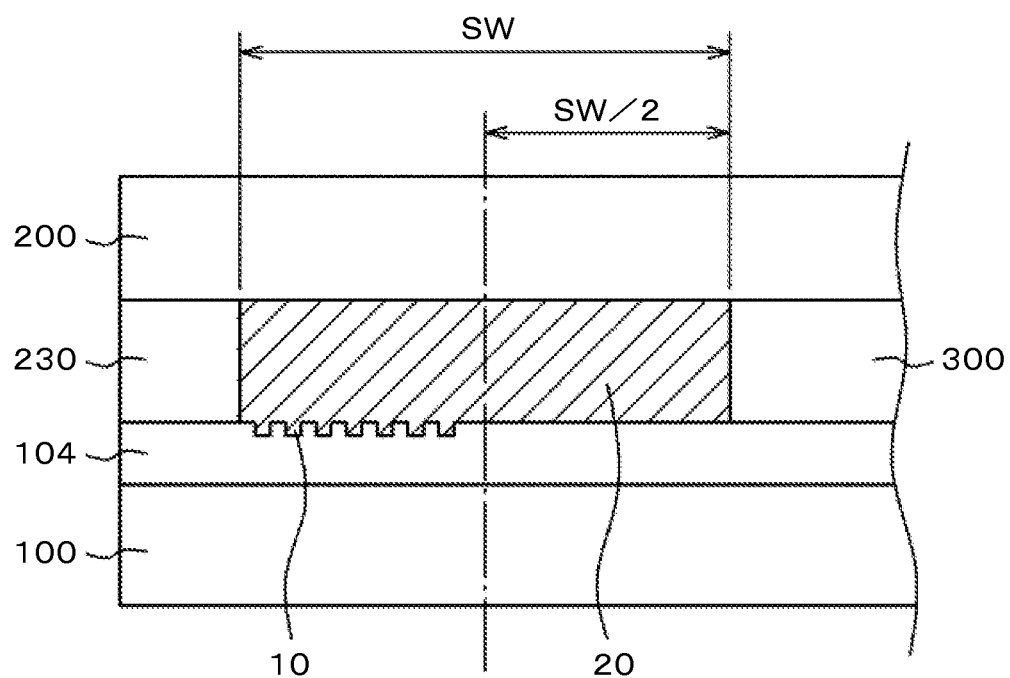
FIG. 11 is a cross sectional view of a seal part of one form according to the second embodiment.

FIG. 11 is a diagram of an example of a cross section corresponding to line C-C in FIG. 10. In FIG. 10, the holes 10 formed on an organic passivation film 104 are provided only on the half of the outer area of the seal part. Here, the outer area of the seal part is located far from the display region, and the inner area of the seal part is located near to the display region. In FIG. 11, suppose that the width of the sealing material 20 is defined as sw, no hole 10 is formed on a region sw/2 from the inner edge of the seal part, whereas the holes 10 are formed on a region on the outer side of the region where no hole 10 is formed. The stress on the seal part becomes greater toward the outer side. In the case in which the holes 10 are not enabled to be formed on the entire seal part because of some reasons, the holes 10 are formed only on the outer area of the seal part, and thus the reliability of the seal part can be enhanced.

Moreover, the range in which the alignment film 106 is formed becomes greater as the density of the holes 10 is greater. Thus, the adhesive strength of the sealing material 20 can be improved. Therefore, the density of the holes 10 is increased, and the effect according to the embodiment of the present invention can be further improved on the seal part where the stress per unit area is greater.

Here, the density of the holes 10 can be defined by the pitch and hole size of the hole 10. For example, in FIG. 6, the area of the hole is defined by d1×d11. The area defined by the pitch p1 in the X-direction and the pitch p2 in the Y-direction is p1×p2. Therefore, the hole density can be defined as d1×d11/p1×p2. Here, in the case of FIG. 3 or FIG. 7, d1=d11.

As described in FIG. 11, the stress on the seal part is greater on the outer area of the seal part, i.e., on the portion located far from the display region. Thus, the density of the holes 10 on the outer area of the seal part is increased more than the density on the inner area of the seal part, i.e., the portion located near to the display region. Accordingly, the effect according to the embodiment of the present invention can be further improved.

In FIG. 10, on the side region S1 on the terminal side, the width of the seal part can be provided greater than the width of the other side regions. Therefore, on the side region S1, the stress per unit area of the seal part is smaller than the stress per unit area of the other side regions. In other words, on the side region S1, the hole density can be made smaller than the hole density on the other side regions. More specifically, the density of the holes 10 on the side region S1 can be made smaller than the density of the holes 10 on the side region S2.

Also on the side region S3, the stress applied to the seal part is smaller on the portion nearer to the side region S1.

Therefore, in the case in which the density of the holes 10 is viewed in the inside of the side region S3, the density of the holes 10 on the portion S31 near to the side region S1 can be made smaller than the density of the holes 10 on the portion S32 near to the side region S2. The same thing can be applied to the side region S4. In other words, in the case in which the density of the holes 10 is viewed in the inside of the side region S4, the density of the holes 10 on the portion S41 near to the side region S1 can be made smaller than the density of the holes 10 on the portion S42 near to the side region S2.

In the description above, the holes on the seal part are formed on the TFT substrate. However, the embodiment of the present invention is also applicable to the seal part on the counter substrate. In this case, the holes are to be formed on the overcoat film corresponding to the organic passivation film. In this case, interconnections and other components are not provided below the overcoat film. Thus, the overcoat film can be removed to the color filter or the black matrix provided between the overcoat film and the counter substrate. The holes can also be formed on the color filter or the black matrix. There might be the case in which a part of the alignment film 106 is entered into the hole or the case in which the inside of the hole is entirely filled with the sealing material depending on factors, such as the viscosity of the alignment film and the tapered shape of the hole. Also in these cases, the sealing material is contacted with the portion in the hole where the alignment film is not formed, and thus the adhesive strength of the sealing material 20 can be enhanced.

In the description above, the embodiments of the present invention are described in accordance with the IPS liquid crystal display device. However, the embodiments of the present invention are also applicable to any liquid crystal display devices in any modes as well as the IPS liquid crystal display device.

In the description above, the embodiments of the present invention are described in accordance with the configuration in which the color filter is formed on the counter substrate. However, the embodiments of the present invention are also applicable to the case in which the color filter is formed on the TFT substrate. In this case, the configuration described above can be applied with no change to any configurations in which the color filter only has to be formed below the organic passivation film. In the case in which the color filter is formed on the organic passivation film, or in the case in which the color filter is used instead of the organic passivation film, the holes described above only have to be formed on the color filter.

As described above, according to the embodiments, the effect of improving the adhesive strength of the seal part can be more efficiently obtained by forming the holes on the organic passivation film on the seal part.

What is claimed is:

1. A liquid crystal display device comprising:
a TFT substrate having a display region and a terminal region and formed with an organic passivation film;
a counter substrate attached to the TFT substrate through a seal part; and
a liquid crystal contained inside the seal part,
wherein a hole is formed at a predetermined pitch on the organic passivation film of the TFT substrate corresponding to the seal part when viewed on a plane,
when the hole is viewed on a plane, a shortest distance from the hole to the hole is four micrometers or greater and 12 micrometers or less at a height of $h1=0.9 \times h2$ from a bottom surface of the hole, where a depth of the hole is defined as h2,
lines are formed between the TFT substrate and the organic passivation film, and are not exposed by the hole,
the hole is arranged in a matrix in a plan view, and
a plurality of the lines are formed between the holes in a plan view.

2. The liquid crystal display device according to claim 1, wherein the planar shape of the hole is a square; and
a length of a side of the square is one micrometer or greater and seven micrometers or less.

3. The liquid crystal display device according to claim 2, wherein an overcoat film made of an organic material is formed on the counter substrate corresponding to the seal part, and a second hole is formed on the overcoat film at a predetermined pitch when viewed on a plane; and
a shortest distance from the second hole to the second hole is four micrometers or greater and 12 micrometers or less, where a depth of the second hole is defined as h2, and the second hole is viewed on a plane at a height $h1=0.9 \times h2$ from a bottom surface of the second hole.

4. The liquid crystal display device according to claim 1, wherein the planar shape of the hole is a circle; and
a diameter of the circle is one micrometer or greater and seven micrometers or less.

5. The liquid crystal display device according to claim 4, wherein an overcoat film made of an organic material is formed on the counter substrate corresponding to the seal part, and a second hole is formed on the overcoat film at a predetermined pitch when viewed on a plane; and
a shortest distance from the second hole to the second hole is four micrometers or greater and 12 micrometers or less, where a depth of the second hole is defined as h2, and the second hole is viewed on a plane at a height $h1=0.9 \times h2$ from a bottom surface of the second hole.

6. The liquid crystal display device according to claim 1, wherein the planar shape of the hole has a major dimension and a minor dimension; and
the major dimension is one micrometer or greater and seven micrometers or less.

7. The liquid crystal display device according to claim 6, wherein an overcoat film made of an organic material is formed on the counter substrate corresponding to the seal part, and a second hole is formed on the overcoat film at a predetermined pitch when viewed on a plane; and
a shortest distance from the second hole to the second hole is four micrometers or greater and 12 micrometers or less, where a depth of the second hole is defined as h2, and the second hole is viewed on a plane at a height $h1=0.9 \times h2$ from a bottom surface of the second hole.

8. The liquid crystal display device according to claim 1, wherein the depth h2 of the hole is one micrometer or greater.

9. The liquid crystal display device according to claim 8, wherein an overcoat film made of an organic material is formed on the counter substrate corresponding to the seal part, and a second hole is formed on the overcoat film at a predetermined pitch when viewed on a plane; and
a shortest distance from the second hole to the second hole is four micrometers or greater and 12 micrometers or less, where a depth of the second hole is defined as h2, and the second hole is viewed on a plane at a height $h1=0.9\times h2$ from a bottom surface of the second hole.

10. The liquid crystal display device according to claim 1, wherein a value $d1\times d11/p1\times p2$ is greater on an outer area of the seal part than on an inner area of the seal part, where a pitch of the hole in a first direction is defined as p1, a pitch in a second direction is defined as p2, a major dimension of the planar shape of the hole is defined as d1, a minor dimension is defined as d11, a portion of the seal part on the liquid crystal side is defined as the inner area, a portion of the seal part on an opposite side of the liquid crystal is defined as the outer area, and a distance from an inner edge to an outer edge of the seal part is defined as a width of the seal part.

11. The liquid crystal display device according to claim 10, wherein on an inner side from a center of the seal part in a width direction, the hole is not formed.

12. The liquid crystal display device according to claim 11, wherein the value d1 is equal to the value d11.

13. The liquid crystal display device according to claim 10, wherein the value d1 is equal to the value d11.

14. The liquid crystal display device according to claim 1, wherein a value $d1\times d11/p1\times p2$ on a first side region is smaller than a value $d1\times d11/p1\times p2$ on a second side region, where a pitch of the hole in a first direction is defined as p1, a pitch in a second direction is defined as p2, a major dimension of the planar shape of the hole is defined as d1, a minor dimension is defined as d11, a side region of the counter substrate on the terminal region side is defined as the first side region, and a side region opposed to the first side region is defined as the second side region.

15. The liquid crystal display device according to claim 14, wherein the value d1 is equal to the value d11.

16. The liquid crystal display device according to claim 1, wherein a value $d1\times d11/p1\times p2$ on a portion of a third side region near to a first side region is smaller than a value $d1\times d11/p1\times p2$ on a portion of the third side region near to a second side region, where a pitch of the hole in a first direction is defined as p1, a pitch in a second direction is defined as p2, a major dimension of the planar shape of the hole is defined as d1, a minor dimension is defined as d11, a side region of the counter substrate on the terminal region side is defined as the first side region, a side region opposed to the first side region is defined as the second side region, a side region on a left side viewed from the first side region is defined as the third side region.

17. The liquid crystal display device according to claim 16, wherein the value d1 is equal to the value d11.

18. The liquid crystal display device according to claim 1, wherein a value $d1\times d11/p1\times p2$ on a portion of a fourth side region near to a first side region is smaller than a value $d1\times d11/p1\times p2$ on a portion of the fourth side region near to a second side region, where a pitch of the hole in a first direction is defined as p1, a pitch in a second direction is defined as p2, a major dimension of the planar shape of the hole is defined as d1, a minor dimension is defined as d11, a side region of the counter substrate on the terminal region side is defined as the first side region, a side region opposed to the first side region is defined as the second side region, and a side region on a right side viewed from the first side region is defined as the fourth side region.

19. The liquid crystal display device according to claim 18, wherein the value d1 is equal to the value d11.

20. The liquid crystal display device according to claim 1, wherein an overcoat film made of an organic material is formed on the counter substrate corresponding to the seal part, and a second hole is formed on the overcoat film at a predetermined pitch when viewed on a plane; and a shortest distance from the second hole to the second hole is four micrometers or greater and 12 micrometers or less, where a depth of the second hole is defined as h2, and the second hole is viewed on a plane at a height $h1=0.9\times h2$ from a bottom surface of the second hole.

* * * * *